United States Patent
Eska

(10) Patent No.: US 9,842,221 B2
(45) Date of Patent: Dec. 12, 2017

(54) ROLE ANALYZER AND OPTIMIZER IN DATABASE SYSTEMS

(71) Applicant: SAP SE, Walldorf (DE)

(72) Inventor: Veit Eska, Malsch (DE)

(73) Assignee: SAP SE, Walldorf (DE)

(*) Notice: Subject to any disclaimer, the term of this patent is extended or adjusted under 35 U.S.C. 154(b) by 182 days.

(21) Appl. No.: 14/752,376

(22) Filed: Jun. 26, 2015

(65) Prior Publication Data

US 2016/0379001 A1    Dec. 29, 2016

(51) Int. Cl.
| | |
|---|---|
| H04L 9/32 | (2006.01) |
| G06F 21/62 | (2013.01) |
| G06F 17/30 | (2006.01) |
| G06Q 30/00 | (2012.01) |
| H04L 29/06 | (2006.01) |

(52) U.S. Cl.
CPC .... G06F 21/6218 (2013.01); G06F 17/30339 (2013.01); G06Q 30/016 (2013.01); H04L 63/102 (2013.01); H04L 63/104 (2013.01)

(58) Field of Classification Search
CPC . G06F 21/6218; G06Q 30/016; H04L 63/102; H04L 63/104
See application file for complete search history.

(56) References Cited

U.S. PATENT DOCUMENTS

| | | | | |
|---|---|---|---|---|
| 6,088,679 A * | 7/2000 | Barkley | ........... | G06Q 10/06311 705/7.13 |
| 6,202,066 B1 * | 3/2001 | Barkley | .............. | G06F 21/6218 707/785 |
| 7,343,628 B2 | 3/2008 | Buchholz et al. | | |
| 7,461,395 B2 | 12/2008 | Ng | | |
| 7,568,217 B1 * | 7/2009 | Prasad | ................ | G06F 21/6218 726/3 |
| 7,680,695 B2 | 3/2010 | Sattler et al. | | |
| 8,024,794 B1 | 9/2011 | Feldman et al. | | |
| 8,042,158 B2 | 10/2011 | Larsen | | |
| 8,090,754 B2 | 1/2012 | Schmidt et al. | | |
| 8,117,643 B2 * | 2/2012 | Vidya | ................... | G06F 21/604 726/2 |
| 8,397,283 B2 * | 3/2013 | Hayler | ................ | G06F 12/1466 715/741 |
| 8,533,772 B2 | 9/2013 | Garg et al. | | |

(Continued)

*Primary Examiner* — Sharon Lynch
(74) *Attorney, Agent, or Firm* — Fountainhead Law Group P.C.

(57) ABSTRACT

Particular embodiments provide a system that analyzes and optimizes roles and authorizations for users of a customer. The system determines which executables have been used by users in the system over a certain time period. Thereafter, the system analyzes and optimizes authorizations within the assigned roles for the users. The authorizations for the roles assigned to the user are then analyzed. The vendor roles typically have redundant authorizations, some of which may be used and some not used. The system can then generate a new customer role for the user with the used authorizations combined into the new role. For example, the authorizations used by the user are combined into the new customer role. This reduces the number of roles the user has assigned to him/her, and also the number of authorizations. Also, the new customer role may be added to other users with the same role at the customer.

20 Claims, 9 Drawing Sheets

(56) References Cited

U.S. PATENT DOCUMENTS

| | | | | |
|---|---|---|---|---|
| 8,983,877 | B2* | 3/2015 | Chari | G06N 99/005 |
| | | | | 706/12 |
| 2002/0026592 | A1* | 2/2002 | Gavrila | G06F 21/6218 |
| | | | | 726/6 |
| 2004/0225893 | A1* | 11/2004 | Ng | G06F 21/10 |
| | | | | 726/27 |
| 2005/0138031 | A1* | 6/2005 | Wefers | G06Q 10/06 |
| 2005/0138419 | A1* | 6/2005 | Gupta | G06F 21/6218 |
| | | | | 726/4 |
| 2006/0090208 | A1* | 4/2006 | Smith | G06F 21/604 |
| | | | | 726/26 |
| 2006/0195575 | A1* | 8/2006 | Delany | G06F 21/41 |
| | | | | 709/225 |
| 2007/0239508 | A1* | 10/2007 | Fazal | G06Q 10/0637 |
| | | | | 705/7.36 |
| 2009/0157570 | A1* | 6/2009 | Pall | G06F 21/6218 |
| | | | | 706/11 |
| 2009/0313677 | A1* | 12/2009 | Vidya | G06F 21/604 |
| | | | | 726/2 |
| 2011/0191485 | A1* | 8/2011 | Umbehocker | G06F 21/6218 |
| | | | | 709/229 |
| 2012/0246098 | A1* | 9/2012 | Chari | G06F 21/604 |
| | | | | 706/12 |
| 2012/0330925 | A1* | 12/2012 | Ramamurthy | G06F 17/30448 |
| | | | | 707/718 |
| 2014/0082689 | A1* | 3/2014 | Christiaens | G06F 21/604 |
| | | | | 726/1 |
| 2014/0109168 | A1* | 4/2014 | Ashley | G06F 21/552 |
| | | | | 726/1 |
| 2014/0201135 | A1* | 7/2014 | Smid | G06F 17/30575 |
| | | | | 707/610 |
| 2014/0317691 | A1* | 10/2014 | Zombik | H04L 41/28 |
| | | | | 726/4 |

* cited by examiner

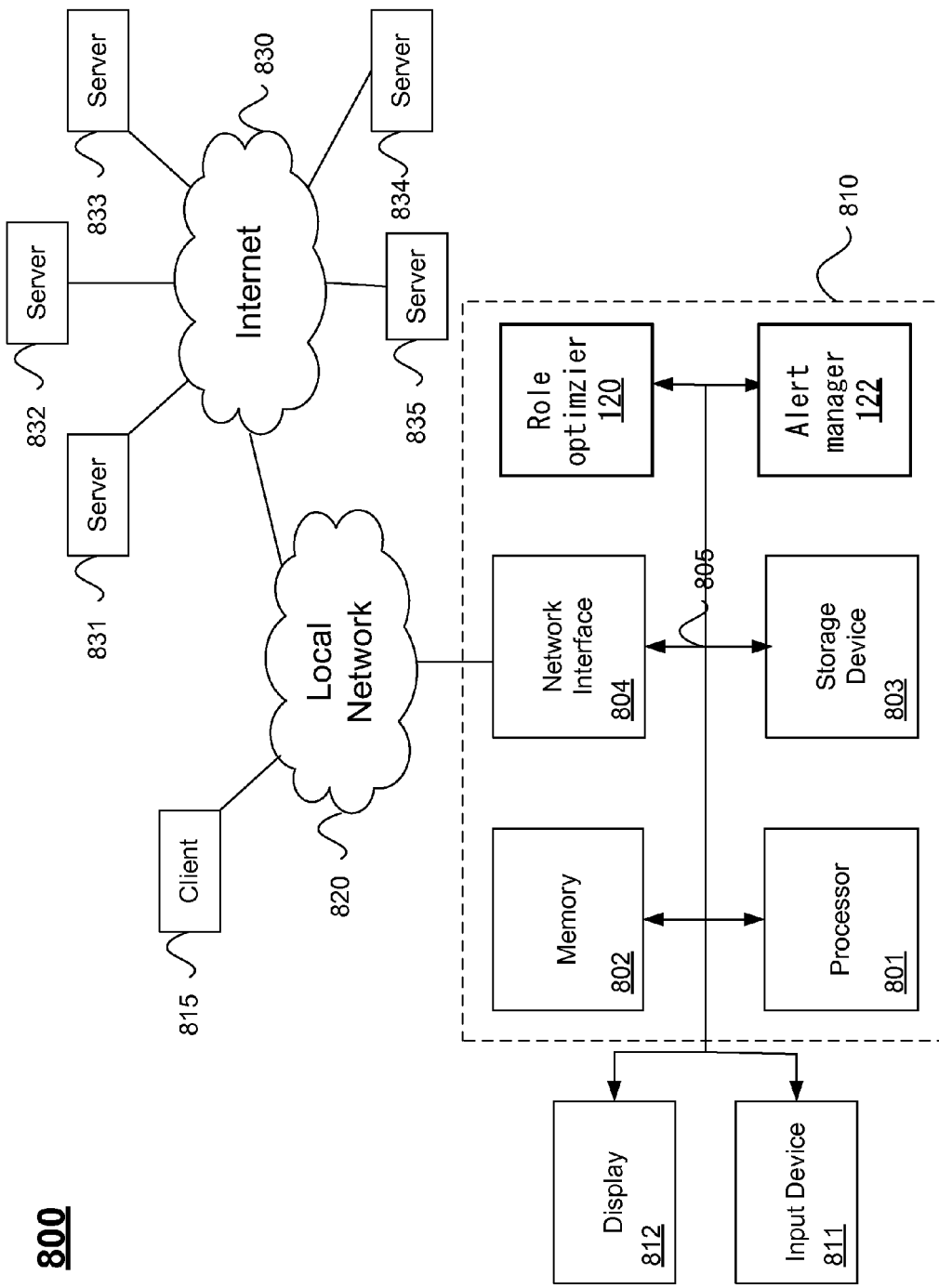

ROLE ANALYZER AND OPTIMIZER IN DATABASE SYSTEMS

BACKGROUND

Unless otherwise indicated herein, the approaches described in this section are not admitted to be prior art by inclusion in this section.

A vendor may provide a product that allows a customer to restrict access to executables (e.g., programs) per user. For example, a user may enter his/her working time into a human resource (HR) program, and see his/her payroll in a payroll application, but the user is restricted from seeing the payroll for other users. Also, a user may record time on projects the user is assigned to, but not other projects. The vendor may ship the product with a large number of roles and authorizations. The roles may be assigned to users. For example, a role may be a project manager. Also, each role may include a number of authorizations. These authorizations are used to determine whether or not the user can access executables and which data. For example, a project manager may be authorized to access more data than a person that is working on the project being managed by the project manager.

Typically, the customer receives the roles from the vendor and then copies the roles into the customer's name space. Then, the customer can assign the roles to users. Due to the large amount of roles and authorizations included in the vendor product, it may be complicated for the customer to manage the number of roles and authorizations especially when updates to the roles and authorizations are received from the customer at a later time. For example, some users may include many roles, which include an even larger number of authorizations. This may be hard for an administrator to keep track of. Further, a user, such as a project lead, is typically assigned many roles and not just one role, and those many roles include many authorizations that may not be used by the user. This may give the user authorizations that the company may not want to give to the user.

SUMMARY

In one embodiment, a method receives a plurality of vendor roles. The vendor roles in the plurality of vendor roles each include a first set of authorizations. A user for a customer at a customer system is determined and a first set of executables assigned to the user at the customer system is determined. The method analyzes in the first set of executables to determine a second set of executables that the user used over a time period and determines a list of vendor roles used by the user in the second set of executables. The second set of executables is analyzed to determine a second set of authorizations that include authorizations that have been used by the user in the second set of executables. A single customer role is determined that aggregates the list of vendor roles and the second set of authorizations based on the analyzing. The second set of authorizations in the single customer role includes less authorizations from authorizations included the first set of authorizations for each of the vendor roles in the list of vendor roles.

In one embodiment, a non-transitory computer-readable storage medium contains instructions, that when executed, control a computer system to be configured for: receiving a plurality of vendor roles, wherein vendor roles in the plurality of vendor roles each include a first set of authorizations; determining a user for a customer at a customer system; determining a first set of executables assigned to the user at the customer system; analyzing the first set of executables to determine a second set of executables that the user used over a time period; determining a list of vendor roles used by the user in the second set of executables; analyzing the second set of executables to determine a second set of authorizations that include authorizations that have been used by the user in the second set of executables; and determining a single customer role that aggregates the list of vendor roles and the second set of authorizations based on the analyzing, wherein the second set of authorizations in the single customer role includes less authorizations from authorizations included the first set of authorizations for each of the vendor roles in the list of vendor roles.

In one embodiment, an apparatus includes: one or more computer processors; and a non-transitory computer-readable storage medium comprising instructions, that when executed, control the one or more computer processors to be configured for: receiving a plurality of vendor roles, wherein vendor roles in the plurality of vendor roles each include a first set of authorizations; determining a user for a customer at a customer system; determining a first set of executables assigned to the user at the customer system; analyzing the first set of executables to determine a second set of executables that the user used over a time period; determining a list of vendor roles used by the user in the second set of executables; analyzing the second set of executables to determine a second set of authorizations that include authorizations that have been used by the user in the second set of executables; and determining a single customer role that aggregates the list of vendor roles and the second set of authorizations based on the analyzing, wherein the second set of authorizations in the single customer role includes less authorizations from authorizations included the first set of authorizations for each of the vendor roles in the list of vendor roles.

The following detailed description and accompanying drawings provide a better understanding of the nature and advantages of particular embodiments.

BRIEF DESCRIPTION OF THE DRAWINGS

FIG. 8 illustrates hardware of a special purpose computing machine configured with the role optimizer and the alert manager according to one embodiment.

DETAILED DESCRIPTION

Described herein are techniques for a role optimization system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a system that analyzes and optimizes roles and authorizations for users of a customer. The system may determine which executables have been used by users in the system over a certain time period. Thereafter, the system may analyze and optimize authorizations within the assigned roles for the users. For example, the used executables are associated with roles the user used and which authorizations that were needed to use the executables. The authorizations for the roles assigned to the user are then analyzed. The vendor roles typically have redundant authorizations, some of which may be used and some not used. The system can then generate a new customer role for the user with the used authorizations combined into the new role. For example, the authorizations used by the user are combined into the new customer role. This reduces the number of roles the user has assigned to him/her, and also the number of authorizations. In this case, vendor roles are not copied in a 1-1 relationship to customer roles. Further, the user may not use all of the activities in the authorizations. The system can combine the activities used into the new customer role. This reduces the number of activities authorized for the user. In one embodiment, the user has only one generated role from roles provided by the vendor for a role that the user has at the customer. This simplifies the assignment and maintenance of roles to business users.

Figure 1:
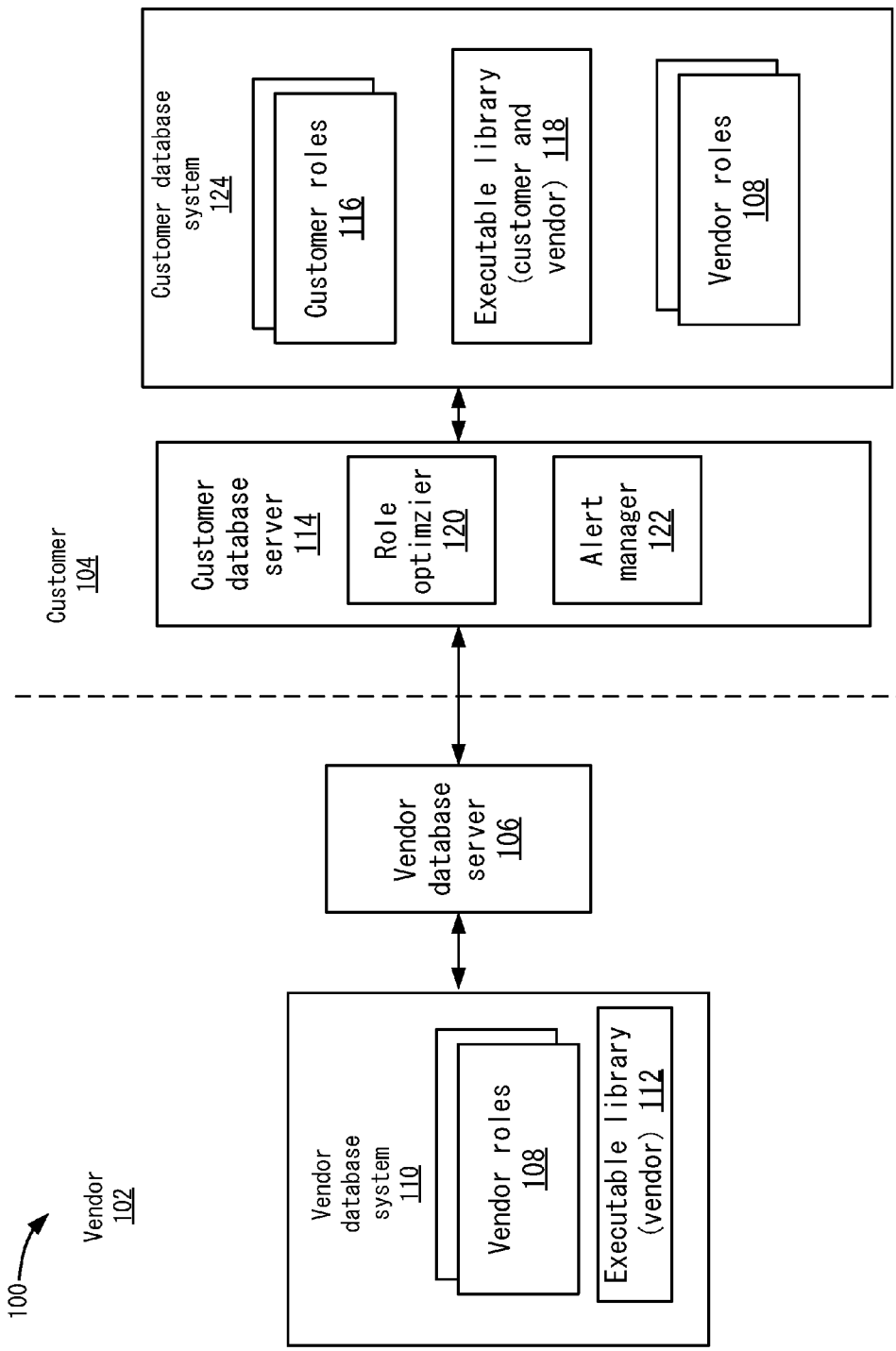
FIG. 1 depicts a simplified system for managing an authorization system according to one embodiment.

FIG. 1 depicts a simplified system 100 for managing an authorization system according to one embodiment. A vendor 102 may be an entity that is providing or selling a product that allows customer 104 to manage roles and authorizations in the customer's system. Vendor 102 may provide the product to customer 104, which can then import the roles and authorizations into their system. Typically, different customers 104 configure the vendor's product differently in their own systems.

Vendor 102 may include a vendor database server 106 that can provide the authorization product to customer 104. The authorization product may include vendor roles 108 stored in a vendor database system 110 and also an executable library 112 for the vendor. Vendor roles 108 may be different roles that the vendor has created. For example, roles may be based on roles that users can hold in the customer system. Roles may include project manager, HR department, and other titles. Each vendor role 108 may include a set of authorizations, which grant access to various executables. For example, a user may be authorized to use a software program, such as an HR program or word processing program. Each authorization may authorize different moldings, which may be a set of activities. The activities may include various activities that can be performed with programs, such as create, change, display, and delete.

Executable library 112 may list the executables created by the vendor. The executables may be various programs that can be run or performed. For example, an executable may be a software program that can be run by users, such as a word processing program.

Vendor database server 106 may send the authorization product including vendor roles 108 and executable library 112 to customer 104. This may be the initial product to be installed at the system for customer 104. Or in other cases, customer 104 may already have installed a previous version of the authorization product, and this product may include a rule analyzer and optimizer 120 (hereinafter rule optimizer 120) and alert manager 122, and possibly updates to roles. The product may now or may be updates to vendor roles 108 and executable library 112.

A customer database server 114 may install the vendor roles 108 as customer roles 116 in a customer database system 124. To install customer roles 116, vendor roles 108 may be renamed into the customer name space. In one embodiment, the customer may insert a letter such as "Z" or other information in front of the vendor role names. Other methods of renaming the vendor roles in the customer name space may be provided. Also, this may be just a recommendation and the vendor roles may not be renamed in the customer name space.

A customer executable library 118 includes executables for both the vendor and customer. Executable library 118 may include the customer names for executables, such as the customer programs that can be executed. Further, executable library 118 may include the transactions that can be performed with the customer system and which transactions have been used by various users. The transactions indicate what executables and authorizations within the roles are needed by users.

Rule optimizer 120 may analyze executable library 118 to determine transactions or other executables used by the customer system. Rule optimizer 120 determines the authorizations used within the roles in the transactions used by the user. In some cases, some roles that were used may have authorizations that are not used. Further, some authorizations may have activities that are not used. Role optimizer 120 can then generate a single role that includes the authorizations and activities that were used by the user for that user. Role optimizer 120 may assign each user in the customer system with an optimized customer role.

Vendor roles 108 and customer roles 116 are stored in transparent tables in the customer database system 124. Transparent tables are tables in which the data is stored directly in the tables and can be accessed via commands from outside the database system. Because vendor 102 may send updates to the vendor roles 108, the customer system needs to be able to map the vendor roles to the newly created optimized roles. An alert manager 122 may be configured to alert customer 104 that some roles have been updated in vendor roles 108. As will be described in more detail below, the mapping between vendor roles 108 and the optimized roles may be stored in a hidden mapping table. The hidden mapping table is hidden from being accessible to users of customer database system 124, but accessible to administrators with special privileges. The hidden mapping table is used to determine how the optimized customer roles 116 were adapted from vendor roles 108.

Executable Library

Figure 2:
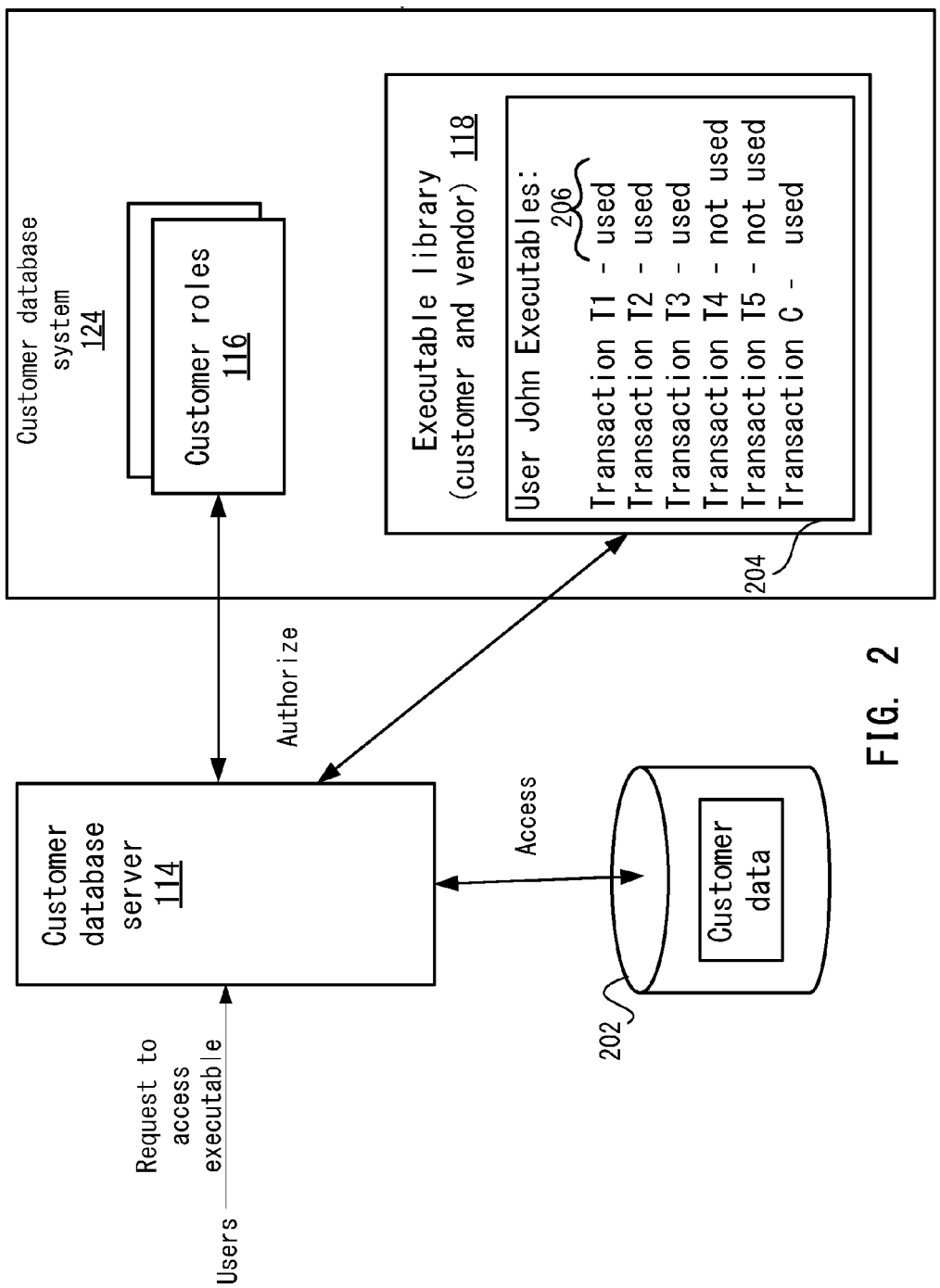
FIG. 2 shows an example of determining when transactions are used in an executable library according to one embodiment.

FIG. 2 shows an example of determining when transactions are used in executable library 118 according to one embodiment. The maintenance of executable library 118 at the customer side will first be discussed. While using the customer system, customer database server 114 may regulate access to users to executables. For example, a user may request access to an executable to perform a transaction, such as access a word processing program or HR database to change customer data. Customer database server 114 determines if the user is authorized to perform the transaction using executable library 118. If so, customer database server 114 determines if the user is authorized to perform the transaction using customer roles 116. Customer database server 114 may then determine if the user is authorized to access customer data stored in database 202 based on the authorization.

When a user successfully accesses an executable, customer database server 114 may indicate that the transaction has been used in executable library 118. The transactions are the execution of programs (e.g., executables). As can be seen, a user "John" can perform transactions T1, T2, T3, T4, T5, and C at 204. At 206, executable library 118 indicates whether or not those transactions were used. For example, transactions T1, T2, T3, and C were used by the user, but transactions T4 and T5 were not.

Role Use Example

Figure 3:
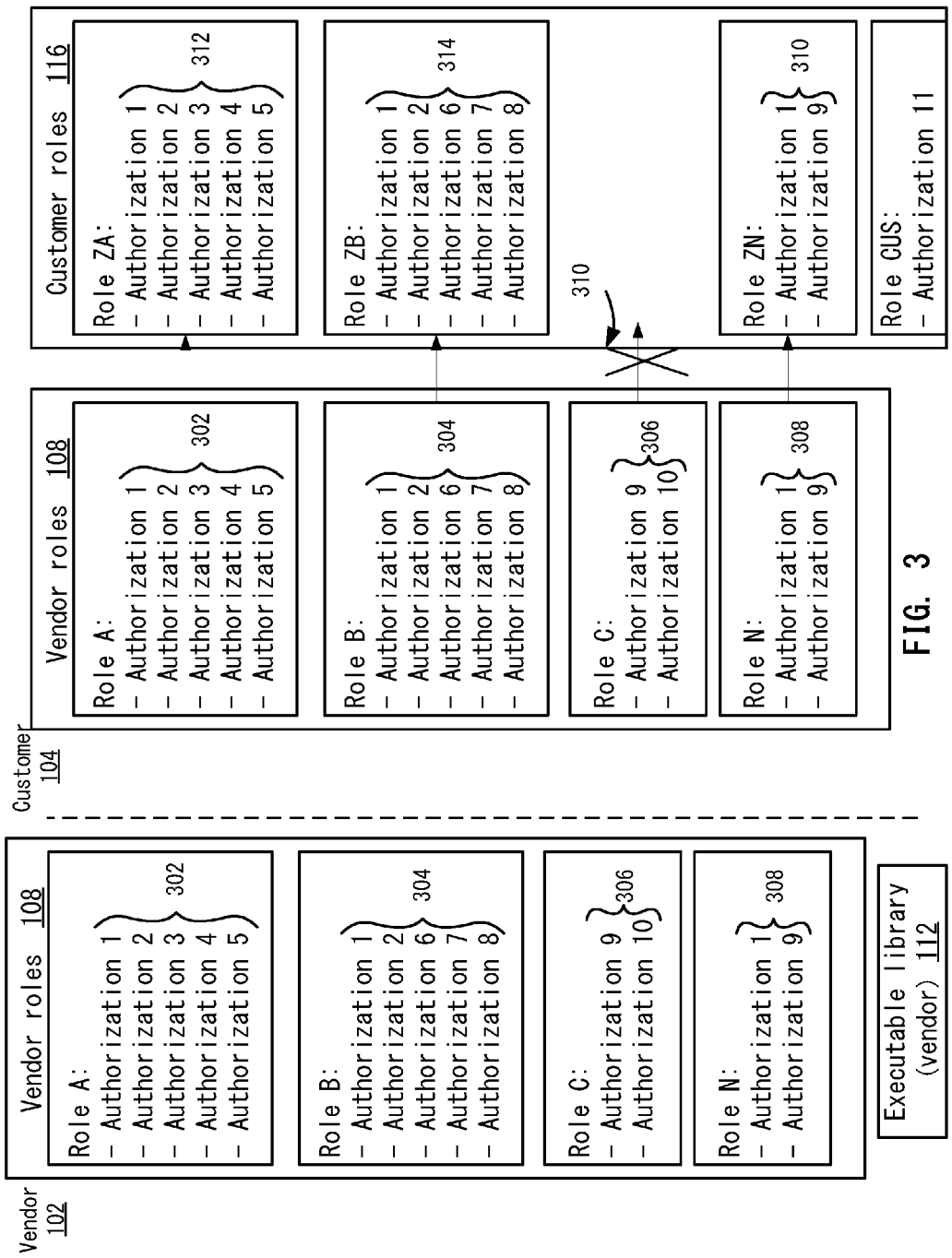
FIG. 3 depicts an example of vendor roles and customer roles according to one embodiment.

FIG. 3 depicts an example of vendor roles 108 and customer roles 116 according to one embodiment. Vendor roles 108 may include role A, role B, role C, . . . , role N. Each role may include a number of authorizations, such as at 302, role A includes authorizations 1, 2, 3, 4, and 5. Each authorization may authorize the role to perform certain activities. Activities may be how an executable can be used, such as an activity may be change, delete, or display. Also, role B includes authorizations 1, 2, 6, 7, and 8 shown at 304, role C includes authorizations 9 and 10 shown at 306, and role N includes authorizations 1 and 9 shown at 308. As can be seen, different roles include different authorizations. In some cases, some roles include similar authorizations, such as authorization 1 is included in the roles A, B, and N, and authorization 2 is included in role A and role B.

Vendor roles 108 may be mapped into the customer name space and this mapping is saved in a hidden mapping table. In one embodiment, this copying may have been performed before the use of role optimizer 120. That is, the customer may have implemented the vendor's product already, but role optimizer 120 will operate on the already assigned roles.

In the example, role ZA corresponds to role A, role ZB corresponds to role B, and role ZN corresponds to role N. Also, customers may generate new roles not included in the vendor roles, such as at 310, role CUS includes authorization 11. Authorization 11 is not included in vendor roles 108 and thus a new role needs to be created by the customer. As can be seen, roles ZA, ZB, and ZN include the same authorizations that correspond to roles A, B, and N, respectively. However, the roles have been mapped into the customer name space. In a conventional example, the customer may map the roles ZA, ZB, ZC, and ZN into the customer name space in a one to one relationship. That is, each role in vendor roles 108 is mapped into a corresponding role in the customer name space. These customer roles should have the same authorizations as the vendor roles. For example, at 312, role ZA includes the same authorizations as vendor role A, and at 314, role ZB includes the same authorizations as vendor role B. However, in the optimization discussed below, role optimizer 120 may not map all vendor roles 108 into corresponding customer roles 116. For example, role optimizer 120 analyzes transactions that were used by the customer. Role optimizer 120 can then determine which authorizations were used by the customer. In one example, authorizations 9 and 10 are not used by the customer. As shown at 310, a role C in the vendor roles 108 has not been mapped into customer roles 116. This may reduce the number of roles that need to be maintained by the customer.

Before the role optimizer, the roles that are mapped into the customer name space may be stored in executable library 118 for the customer. Then, roles are assigned to users. For example, the roles ZA, ZB, ZN, and CUS are assigned to a user John. Role optimizer 120 can then analyze the roles and executables for the users to optimize the roles assigned to each user.

User Role Optimization

Figure 4A:
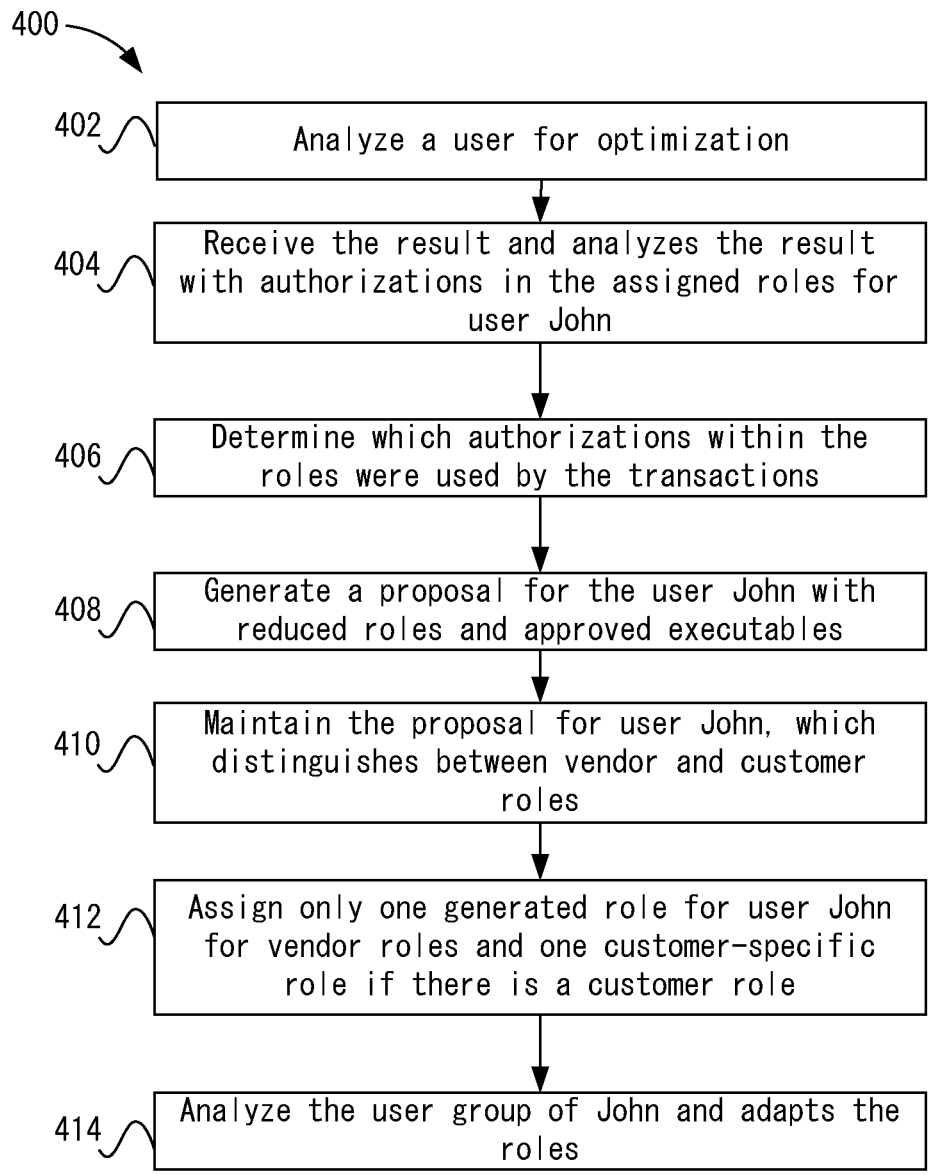
FIGS. 4A and 4B depicts an example of the optimization according to one embodiment.
Figure 4B:
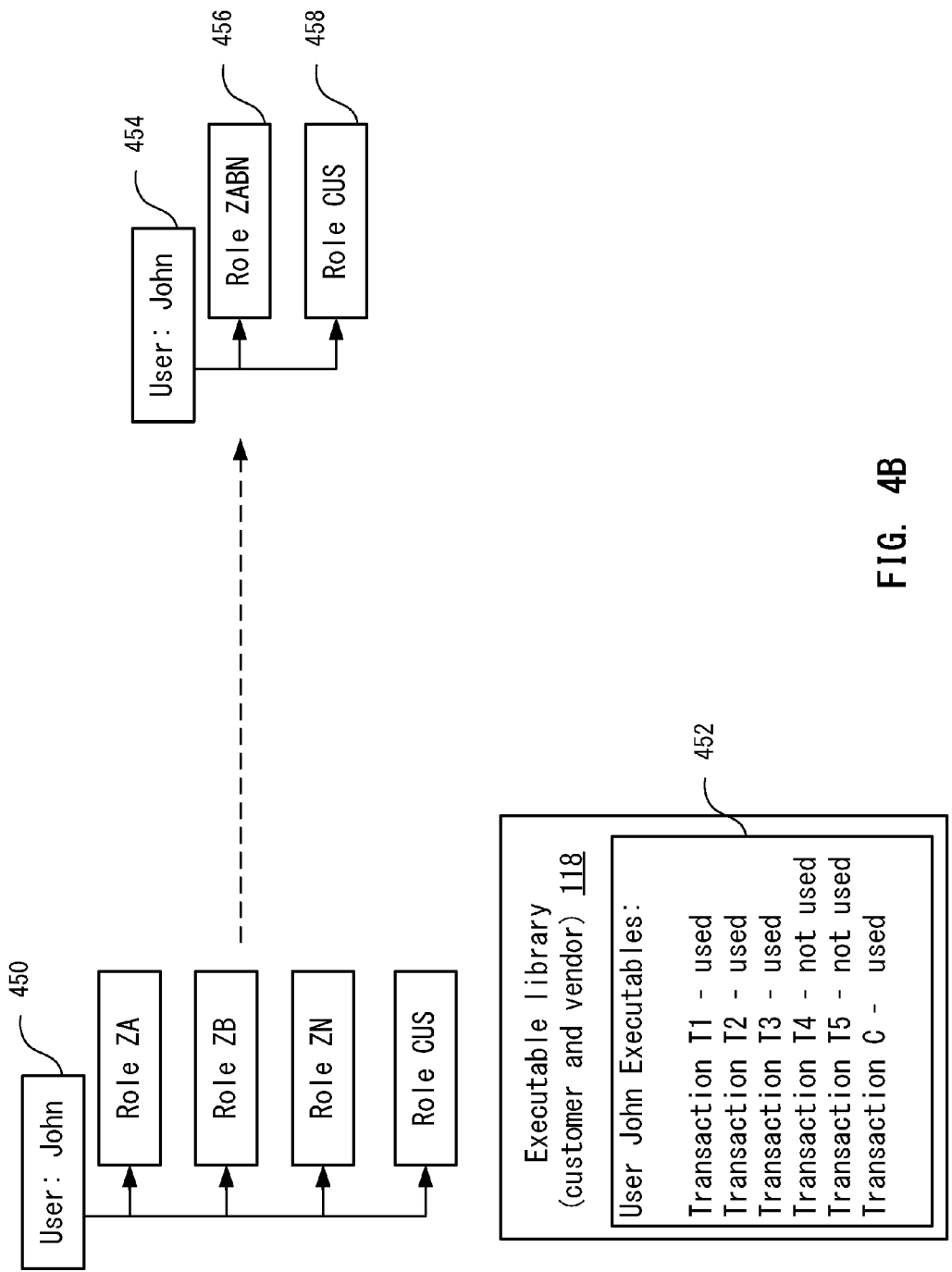

FIGS. 4A and 4B depict an example of the optimization according to one embodiment. In FIG. 4A, at 402, role optimizer 120 analyzes a user for optimization. For example, role optimizer 120 may access executable library 118 to access the user John to determine the roles assigned to the user John as shown at 450 in FIG. 4B. In this example, the customer may have implemented a previous version of the vendor's product and assigned customer roles to the user John. Role optimizer 120 may then be run to analyze the roles already assigned to the user John. Although the user John is described, role optimizer 120 may analyze a group of users and what executables the group used. The group may be multiple users with the same role in the customer system, such as a group of project leads. There can be also differences from project lead to project lead due to historical role assignments which needs to be optimized by the role optimizer. Also, role optimizer 120 may extract executables from executable library 118. The executable may include transactions, which detail what transactions the user can perform with the executable. Also, the executables may include reports, business application programming interfaces (BAPIs), business add-ins (BADIs), function modules, WebDynpros, .exe files, and so on. In this example, the transactions from the executables shown at 452 from executable library 118 for a certain time period. The transactions that are extracted may be which ones are allowed to John and if the executable (and how often) they were used by the user John.

At 404, role optimizer 120 receives the result and analyzes the result with authorizations in the assigned roles for user John. For example, at 452, the transactions used by the user John are shown as transactions T1, T2, T3, and C. The transactions T4 and T5 are not used.

At 406, role optimizer 120 determines which authorizations within the roles were used by the transactions. For example, not all the transactions for the executables may have been used and thus not all of the authorizations. In this case, roles ZA, ZB, ZN, and CUS may have been used by user John. However, the user John may not have used the role ZC that includes authorizations 11 and 12. Also, within the roles used by the user John, role optimizer 120 may determine a subset of authorizations that were used. For example, some roles may have duplicated authorizations while some roles have authorizations that are not used. Referring back to FIG. 3, it is possible that the user John used authorizations 1 and 2, but not authorizations 3, 4, 5, 6, 7, 8, 9, and 10. Role optimizer 120 may determine which authorizations were used in different ways. For example, role optimizer 120 may access database tables to determine the authorization objects stored with the transaction. This would indicate which authorizations were used by the transactions. However, for some executables, role analyzer 120 may have to perform more actions to determine the used authorziations because the authorizations are not saved with the transaction. For example, role optimizer 120 may perform a trace (e.g., authorization trace) by using business executables and to review the vendor roles that are shipped to the customer to determine the authorizations. In that case, a report needs to be scheduled which is collecting the authorization information for each executable—similar to the authorization trace.

At 408, after the analysis, role optimizer 120 generates a proposal for the user John with reduced roles and approved executables. The proposal for the user John may include the roles ZA, ZB, ZN, and role CUS. However, role ZC is not included in the proposal. Further, a reduced number of transactions in the executables may be included with the roles. For example, only transactions that are needed may be included. For example, the transactions that may be possible may include transactions T1, T2, T3, and C. Further, sometimes the activities in the authorizations that are used are the same in the proposal. In other cases, the authorizations may have fewer activities. That is, the authorization allows the user John to perform fewer activities. For example, the standard activities for an authorization may correspond to create (code 01), change (code 02), display (code 03), and delete (code 06). The user John may have only used the activities change and display, and the authorization allows only the activities of change and display. At the end, roles ZA, ZB, ZN are condensed to one new role ZABN where the authorizations are added only once with the correct activities. Without the optimization role ZA has perhaps 20 authorization objects, role ZB around 30 authorization objects, and role ZN around 15 authorization objects. In all three roles, the system has one or more authorization objects that are maintained in different ways. In one example, role ZA has an authorization AUTH1 with code 01 and 02, role ZB has an authorization AUTH1 with code 02 and 03, and role ZN has an authorization AUTH1 with code 06 only. In the new optimized role ZABN has the authorization AUTH1 with code 01, 02, 03, 06. Also, the unnecessary authorizations (some of the 20, 30, or 15 authorizations) for unused executables are no longer part of role ZABN.

At 410, role optimizer 120 maintains the new role for the user John as a proposal to use with other users of the customer. The new role has a name that distinguishes between vendor and customer roles. As will be described below, the new role may be assigned to other users that have the same role in the customer as the user John. In this case, in FIG. 4B, role optimizer 120 may generate a new customer role in the customer space as role ZABN at 456 and role CUS at 458. This may generate a new customer role that can be assigned to users. The customer role ZABN may include authorizations from the vendor roles A, B, and N, but not all of the authorizations. Further, a reduced number of activities for an authorization may be included or activities for different authorization objects for the same authorization combined.

At 412, role optimizer 120 assigns only one generated customer role for user John for vendor roles and one customer-specific role if there is a customer role. By only assigning one customer role, the role assignment in the customer system is simplified. For example, as shown at 454, the user John has only two roles assigned to him. It should be noted that if the user John has multiple roles in the company, such as the user John is a project lead, but also a sales person, another customer role may be added to the user John for the sales person. This customer role may also be customized, such as optimized customer role ZYXVB may include the authorizations for a sales person, and is determined as described above. At 456, the role ZABN is from the vendor roles, and at 458, the customer role CUS is a customer specific role.

At 414, role optimizer 120 analyzes the user group of John and adapts the roles. In this case, role optimizer 120 may analyze a set of users to look for users in the same class as the user John. The same class may be a same group, level, or classification as the user John (e.g. project leads). Role optimizer 120 may generate a proposal for the new role assigned to users within the same class using the new role. For example, if the user John is a project lead, then other users that are project leads in the customer should be assigned role ZABN. Thus, not everyone in the customer has different roles. Rather, the optimization is performed for a user (or group of users) to determine the optimized role. Then, that optimized role can be assigned to other users. This customizes the roles for each different customer at the customer site based on how each different customer is using their systems. In one embodiment, after system wide optimization, the 1-1 mapped customer roles that were previously assigned may be deleted. This may reduce the number of roles that need to be maintained in the customer system. When a new user in the customer system is instantiated, role optimizer 120 may search for an optimized role that fits the new user. This optimized role is then assigned to the new user.

If there is a customer or new business that has never used a database system using the vendor's authorizations, then the customer may start with a 1-1 mapping from vendor roles 108 to customer roles 116 as shown in FIG. 3. Then, after using the customer roles, role optimizer 120 may be run to optimize the customer roles in the customer namespace.

Figures 5A, 5B:
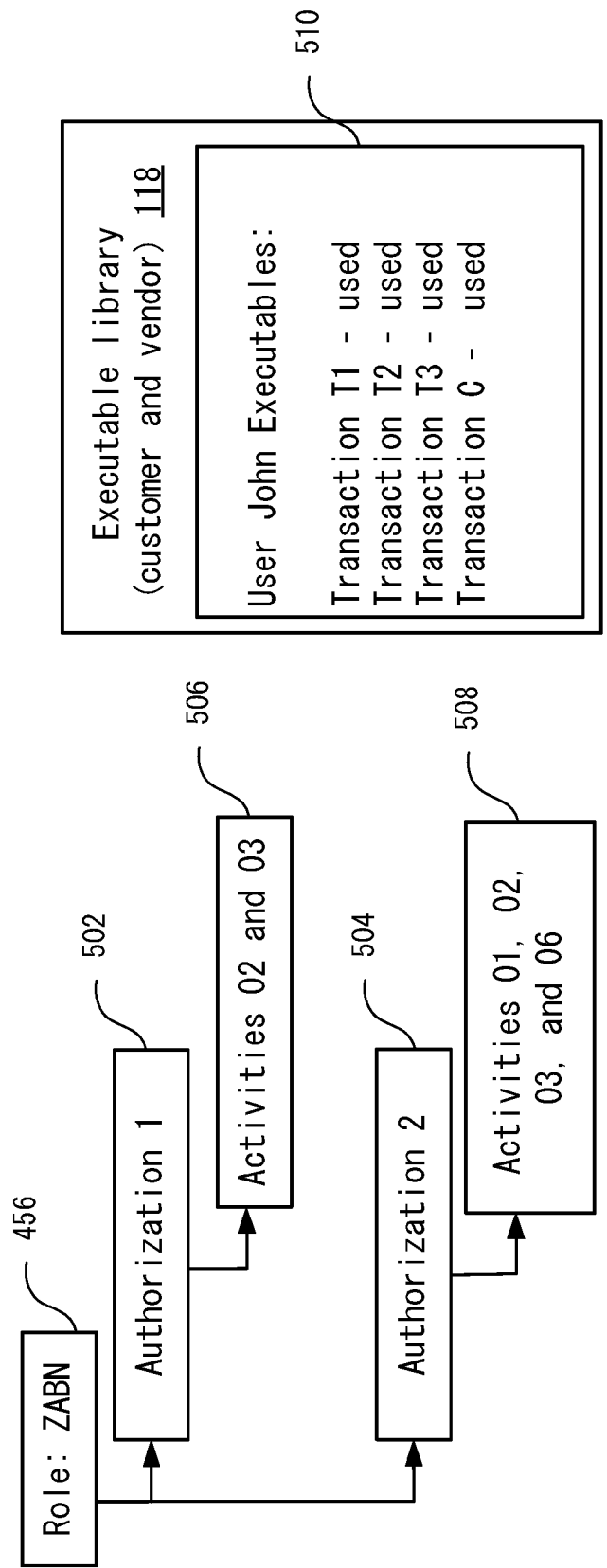
FIG. 5A shows an expanded example of role ZABN according to one embodiment.
FIG. 5B depicts a reduced number of transactions has been assigned to the user John.

FIG. 5A shows an expanded example of role ZABN at 456 according to one embodiment. Role ZABN includes authorizations 1 and 2 at 502 and 504, respectively. No other authorizations are included in this role. This decreases the number of authorization objects that are assigned to a user as only one authorization object is needed for the vendor roles. Thus, role ZABN has been simplified in that fewer authorizations have been included. Further, authorization 1 is not duplicated across many different roles.

Also, the activities included in specific authorizations may be changed from the vendor authorizations. For example, at 506, the activities of 02—"change" and 03—"display" are assigned to authorization 1. The activities for authorization 2 may remain the same though as create, change, display, and delete (01, 02, 03, and 06) as shown at 508. In another example, activities for different authorization objects for authorization 1 may be combined. Also, in FIG. 5B, at 510, a reduced number of transactions has been assigned to the user John. That is, only transactions T1, T2, T3, and C are allowed for the user John executables.

Figure 6:
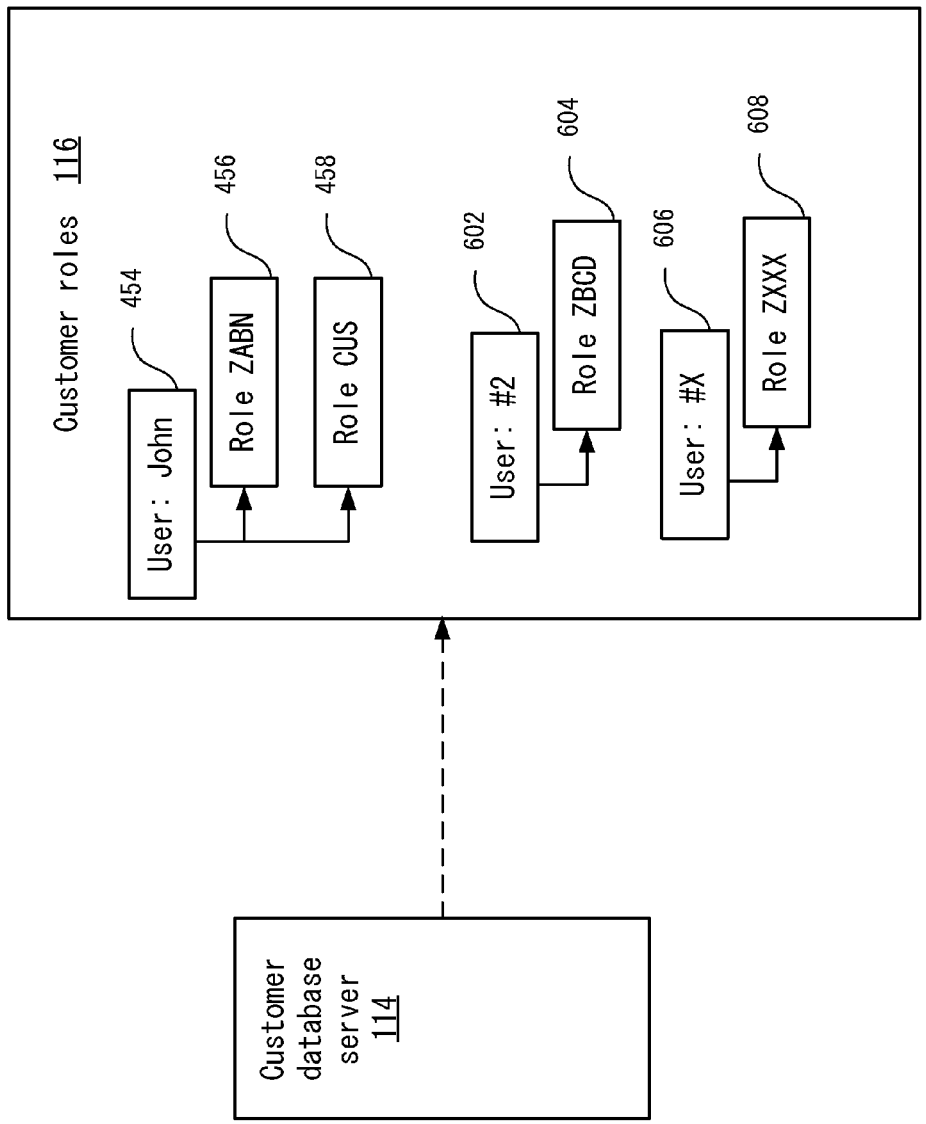
FIG. 6 shows an example of different users that are assigned roles according to one embodiment.

FIG. 6 shows an example of different users that are assigned roles according to one embodiment. Using the above system of optimization, each user in the customer system may be assigned one role from the vendor roles. This may simplify the assignment of roles. For example, at 254, user John includes the role ZABN. However, a user #2 at 602 includes role ZBCD at 604. Also, a user #3 at 606 includes a role ZXXX at 608, where each "X" is a different role. Thus, each user may include a unique role based on the transactions the user has performed previously and the role in the customer for the user. In one example, project leads have the role ZABN like the user John. Also, project team members have the role ZBCD for example and quality experts have the role ZXXX. As can be seen, the vendor roles 108 may be mapped to customer roles in a 1:N relationship. The vendor role B has been copied multiple times.

When customer database server 114 accesses customer roles 116 to authorize a user, customer database server 114 may first access the role associated with the user. For example, the user John is attempting to access the system and customer database server 114 retrieves the role ZABN from customer roles 116. Then, customer database server 114 determines the authorizations associated with this role. Then, the activities of the authorizations of change and display are determined. Customer database server 114 can then determine if the user can access the executable requested based on the role and activities assigned to the user.

Because only one role needs to be accessed by customer database server 114, the functioning of customer database server 114 is improved. For example, conventionally, customer database server 114 may have had to retrieve roles ZA, ZB, and ZN separately. With the new optimized role, some unnecessary keys in the database system for the unused authorizations are removed. Further, other parts of the authorization process that are not used can be removed when not used. Then, customer database server 114 would have had to review the authorizations in each role ZA, ZB, and ZN to determine whether or not the user John can access the executable. Further, due to the reduced number of authorizations or activities, the user John cannot access executables or activities that the company may not want the user John to perform.

Enhancement Packages

Figure 7:
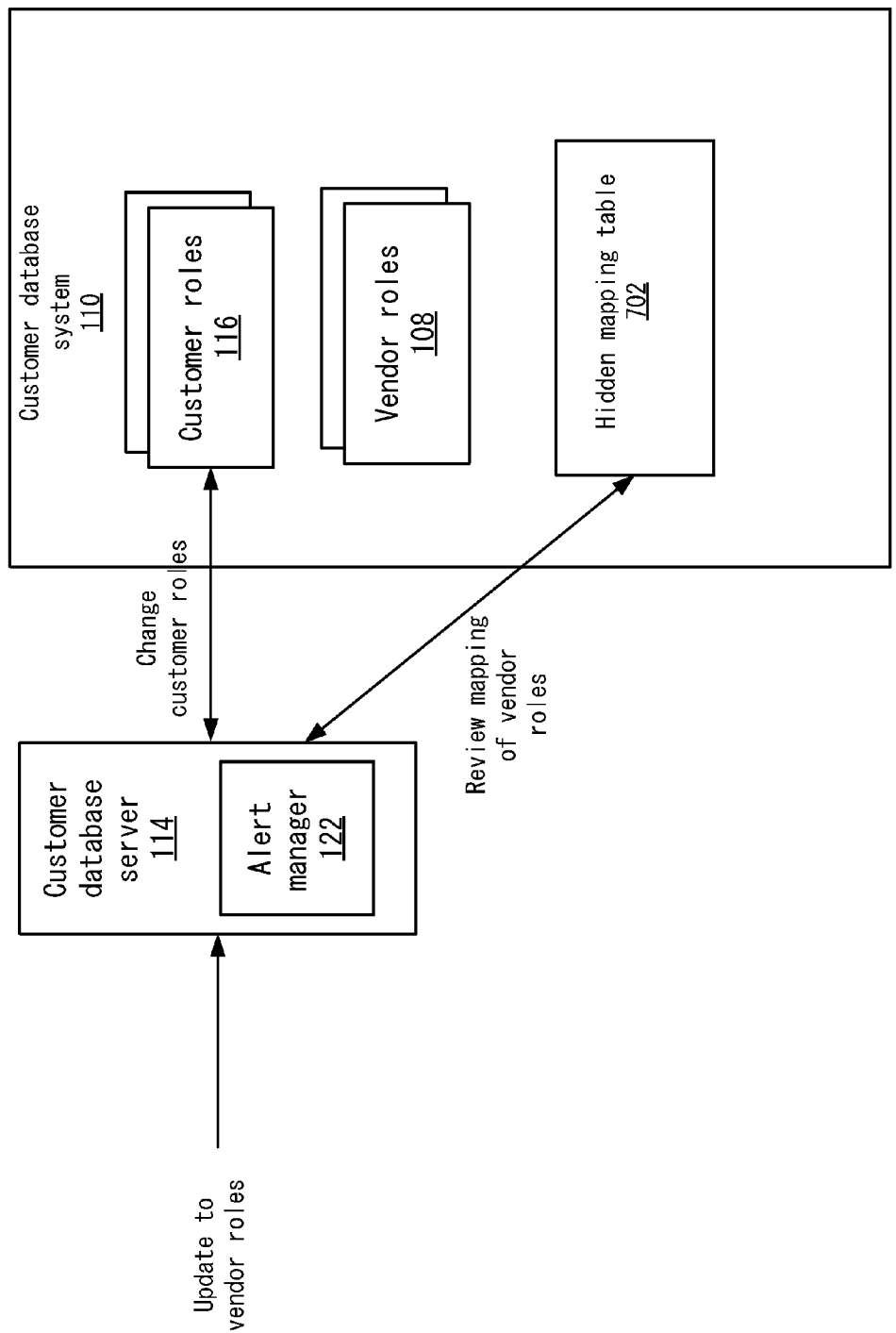
FIG. 7 depicts an example of an alert manager for handling the enhancement packages according to one embodiment.

In some cases, vendor 102 may deliver enhancement packages with new functionalities that may include new or changed roles. Because customer 104 may change the vendor roles into a single role instead of renaming the roles in a 1-1 relationship, particular embodiments need to manage the changes differently. FIG. 7 depicts an example of alert manager 122 for handling the enhancement packages according to one embodiment. Because the vendor roles 108 are not mapped 1-1 to the customer roles 116, alert manager 122 stores a mapping of vendor roles 108 to optimized customer roles in a hidden mapping table 702. Hidden mapping table 702 may only be used when updates are received. Alert manager 122 may retrieve vendor roles 108 when an enhancement package is received. Then, alert manager 122 can compare the new roles or changed roles in the enhancement package to the vendor roles 108. Alert manager 122 can then determine which roles have changed and/or which roles have been added.

Hidden mapping table 702 also includes information that indicates which vendor roles 108 and authorizations/activities were copied into customer roles 116. For example, for role ZABN, hidden mapping table 702 may indicate that authorizations 1 and 2 were copied from roles A, B, and/or C to role ZABN. Also, for authorization 1, the activities of change and display were added. Alert manager 122 may then determine if any of these roles have changed in the enhancement package. If one of the roles has changed, alert manager 122 can determine whether the customer role ZABN needs to be changed. For example, if the authorization 1 is removed/replaced/extended from roles A, B, and N, then that authorization may need to be removed/replaced/extended from role ZABN. Alert manager 122 can then determine that roles A, B, and N have had authorization 1 removed/replaced/extended and then use hidden mapping table 702 to map roles A, B, and N to role ZABN for user John. Then, alert manager 122 removes/replace/extend the authorization from role ZABN. Also, the activities for authorizations may change. For example, the change activity may be removed from authorization 1, and thus alert manager 112 removes the change activity from the role ZABN. In one embodiment, alert manager 112 may make the proposed change and an administrator or another person will confirm the change. The above is different than if the roles were copied in a 1-1 relationship from the vendor, where in this case, the customer could overwrite the role in the customer database system.

Further, new roles may be added by the enhancement package. Alert manager 122 may analyze the execution library 118 to determine if the new role has been used by the user. If so, then alert manager 122 may alert role optimizer 120 that the user's role may be adjusted. For example, role ZABN may be adjusted to be role ZABNX, where X is a new role found in the enhancement package. Also, the authorizations included in new role ZABNX may be updated.

Accordingly, particular embodiments reduce the number of roles that are associated with the user and the number of roles that have to be maintained in the customer system. This reduces the maintenance of the roles. Also, the performance of the database system is improved due to processing fewer roles and authorizations.

FIG. 8 illustrates hardware of a special purpose computing machine configured with role optimizer 120 and alert manager 122 according to one embodiment. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable storage mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. In the Internet example, software components or services may reside on multiple different computer systems 810 or servers 831-835 across the network. The processes described above may be implemented on one or more servers, for example. A server 831 may transmit actions or messages from one component, through Internet/cloud 830, local network 820, and network interface 804 to a component on computer system 810. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a plurality of vendor roles for mapping to a plurality of customer roles for a customer at a customer system for an authorization product, wherein the plurality of vendor roles include a first set of authorizations and are created by a vendor of the authorization product;
   mapping, by the computing device, at least a portion of the plurality of vendor roles into a plurality of corresponding customer roles in the customer system, wherein the customer roles are used in the customer system implementing the authorization product;
   analyzing, by the computing device, a first set of executables assigned to a user via one or more of the plurality of customer roles to determine a second set of executables that the user used over a time period;
   determining, by the computing device, a list of customer roles used by the user in the second set of executables;
   analyzing, by the computing device, the second set of executables to determine a second set of authorizations that include authorizations that have been used by the user in the second set of executables;
   creating, by the computing device, a single customer role that aggregates the list of customer roles and the second set of authorizations based on the analyzing, wherein the second set of authorizations in the single customer role includes fewer authorizations than the first set of authorizations;
   storing, by the computing device, a hidden mapping table based on the plurality of vendor roles;
   receiving, by the computing device, an update to the plurality of vendor roles; and
   using, by the computing device, the hidden mapping table to determine whether the single customer role should be changed.

2. The method of claim 1, wherein determining the list of customer roles comprises retrieving a set of transactions assigned to the user in the first set of executables, the set of transactions defining what the user can perform with the first set of executables when using the customer system.

3. The method of claim 1, wherein analyzing the first set of executables comprises determining which of the first set of executables were used and which of the first set of executables were not used by the user in the time period.

4. The method of claim 1, wherein analyzing the second set of executables comprises:
   determining authorizations that were used by the user; and
   adding those authorizations to the second set of authorizations.

5. The method of claim 4, wherein determining authorizations that were used by the user comprises accessing a database table storing an executable to retrieve an authorization object assigned to an executable.

6. The method of claim 5, wherein determining authorizations that were used by the user comprises performing an authorization trace to trace the executable to an authorization in a customer role.

7. The method of claim 1, wherein analyzing the second set of executables comprises:
   determining which activities were used by authorizations in the second set of authorizations, and
   adding the used activities to the single customer role, wherein activities not used are not added to the single customer role.

8. The method of claim 7, wherein determining which activities are used by authorizations comprises:
   combining activities used by different authorization objects for the same authorization in different customer roles as the used activities for an authorization in the second set of authorizations for the single customer role.

9. The method of claim 1, further comprising:
   generating a new customer role not included in the plurality of vendor roles, the new customer role including an authorization not included in the plurality of vendor roles.

10. The method of claim 1, wherein the hidden mapping table is used to determine which changes are made to the plurality of vendor roles.

11. The method of claim 1, wherein the user includes the single customer role based on the list of customer roles for a single role the user has at the customer system.

12. The method of claim 1, further comprising:
    searching for other users with a similar role to the user at the customer system; and
    assigning the single customer role to the other users.

13. A non-transitory computer-readable storage medium containing instructions, that when executed, control a computer system to be configured for:

receiving a plurality of vendor roles for mapping to a plurality of customer roles for a customer at a customer system for an authorization product, wherein the plurality of vendor roles include a first set of authorizations and are created by a vendor of the authorization product;

mapping at least a portion of the plurality of vendor roles into a plurality of corresponding customer roles in the customer system, wherein the customer roles are used in the customer system implementing the authorization product;

analyzing a first set of executables assigned to a user via one or more of the plurality of customer roles to determine a second set of executables that the user used over a time period;

determining a list of customer roles used by the user in the second set of executables;

analyzing the second set of executables to determine a second set of authorizations that include authorizations that have been used by the user in the second set of executables;

creating a single customer role that aggregates the list of customer roles and the second set of authorizations based on the analyzing, wherein the second set of authorizations in the single customer role includes fewer authorizations than the first set of authorizations;

storing a hidden mapping table based on the plurality of vendor roles;

receiving an update to the plurality of vendor roles; and using the hidden mapping table to determine whether the single customer role should be changed.

14. The non-transitory computer-readable storage medium of claim 13, wherein determining the list of customer roles comprises retrieving a set of transactions assigned to the user in the first set of executables, the set of transactions defining what the user can perform with the first set of executables when using the customer system.

15. The non-transitory computer-readable storage medium of claim 13, wherein analyzing the first set of executables comprises determining which of the first set of executables were used and which of the first set of executables were not used by the user in the time period.

16. The non-transitory computer-readable storage medium of claim 13, wherein analyzing the second set of executables comprises:
determining authorizations that were used by the user; and
adding those authorizations to the second set of authorizations.

17. The non-transitory computer-readable storage medium of claim 13, wherein analyzing the second set of executables comprises:
determining which activities were used by authorizations in the second set of authorizations, and
adding the used activities to the single customer role, wherein activities not used are not added to the single customer role.

18. The non-transitory computer-readable storage medium of claim 17, wherein determining which activities are used by authorizations comprises:
combining activities used by different authorization objects for the same authorization in different customer roles as the used activities for an authorization in the second set of authorizations for the single customer role.

19. The non-transitory computer-readable storage medium of claim 13, wherein the hidden mapping table is used to determine which changes are made to the plurality of vendor roles.

20. An apparatus comprising:
one or more computer processors; and
a non-transitory computer-readable storage medium comprising instructions, that when executed, control the one or more computer processors to be configured for:

receiving a plurality of vendor roles for mapping to a plurality of customer roles for a customer at a customer system for an authorization product, wherein the plurality of vendor roles include a first set of authorizations and are created by a vendor of the authorization product;

mapping at least a portion of the plurality of vendor roles into a plurality of corresponding customer roles in the customer system, wherein the customer roles are used in the customer system implementing the authorization product;

analyzing a first set of executables assigned to a user via one or more of the plurality of customer roles to determine a second set of executables that the user used over a time period;

determining a list of customer roles used by the user in the second set of executables;

analyzing the second set of executables to determine a second set of authorizations that include authorizations that have been used by the user in the second set of executables;

creating a single customer role that aggregates the list of customer roles and the second set of authorizations based on the analyzing, wherein the second set of authorizations in the single customer role includes fewer authorizations than the first set of authorizations;

storing a hidden mapping table based on the plurality of vendor roles;

receiving an update to the plurality of vendor roles; and using the hidden mapping table to determine whether the single customer role should be changed.

* * * * *